United States Patent
Brusewitz

[11] Patent Number: 5,504,849
[45] Date of Patent: Apr. 2, 1996

[54] METHOD OF MOVING A PIXEL A SUBPIXEL DISTANCE

[75] Inventor: Harald Brusewitz, Älvsjö, Sweden

[73] Assignee: Televerket, Farsta, Sweden

[21] Appl. No.: 401,117

[22] Filed: Mar. 9, 1995

Related U.S. Application Data

[63] Continuation of Ser. No. 253,590, Jun. 3, 1994, abandoned, which is a continuation of Ser. No. 969,219, Feb. 12, 1993, abandoned.

[30] Foreign Application Priority Data

Aug. 15, 1990 [SE] Sweden ..................... 9002645

[51] Int. Cl.⁶ ..................... G06T 13/00
[52] U.S. Cl. ..................... 395/152; 395/138
[58] Field of Search ..................... 395/138, 152; 382/45, 56, 205, 295, 299, 300, 308; 345/202

[56] References Cited

U.S. PATENT DOCUMENTS

| | | | |
|---|---|---|---|
| 4,361,853 | 11/1982 | Remy et al. ..................... | 358/167 |
| 4,578,812 | 3/1986 | Yui ..................... | 382/41 |
| 4,653,013 | 3/1987 | Collins et al. ..................... | 395/139 |
| 5,025,405 | 6/1991 | Swanson ..................... | 340/728 |
| 5,054,100 | 10/1991 | Tai ..................... | 340/728 |

FOREIGN PATENT DOCUMENTS 0280316  8/1988  European Pat. Off. .

*Primary Examiner*—Heather R. Herndon
*Assistant Examiner*—Joseph H. Feild
*Attorney, Agent, or Firm*—Oblon, Spivak, McClelland, Maier & Neustadt

[57] ABSTRACT

The invention relates to a method of moving a pixel a subpixel distance and is intended to be applied in picture coding methods to determine the value of a pixel located between the fixed pixels on the screen. The pixel value is calculated using a known motion vector and the pixel values located in the vicinity of the corresponding pixel in the previous picture. According to the invention at least 3×3 pixels from the previous picture are used and the pixel value is calculated as a sum of the previous pixel values weighted by coefficients depending of the motion vector. The coefficients are preferably calculated as polynomials of the subpixel part of the motion vector.

3 Claims, 1 Drawing Sheet

METHOD OF MOVING A PIXEL A SUBPIXEL DISTANCE

This application is a Continuation of application Ser. No. 8/253,590, filed on Jun. 3, 1994, now abandoned which was a Continuation of application Ser. No. 07/969,219, filed on Feb. 12, 1993, now abandoned which was filed as PCT application PCT/SE91/00530 on Aug. 12, 1991.

FIELD OF THE INVENTION

The present invention relates to a method of moving a pixel a subpixel distance. Subpixel distance refers to a distance shorter than the distance between two adjacent pixels (pixel=picture element). The invention is intended to be applied in the picture coding methods for determining the value of a pixel located between the fixed pixels on the screen. This situation may occur in moving pictures where the pixels are moved arbitrary distances and thus, may end up between defined positions. The situation may also occur in conversion between different picture formats, so-called standard conversion.

STATE OF THE ART

According to the prior art usually 2×2 filters with so-called bilinear interpolation are used. The drawback with this technique is that it provides blurry pictures, especially in positions between two pixels. The reason is that the 2×2 filter has strong low-pass characteristics. This drawback is overcome to a great extent with the invention utilizing 3×3-filters or greater.

4×4 filters are also previously known, however, not with functions for calculating coefficients of arbitrary positions but only for half pixel distances. However, the present invention provides a method for arbitrary pixel distances.

SUMMARY OF THE INVENTION

Thus, the present invention provides a method of moving a pixel a subpixel distance, wherein the value of the pixel is calculated using a known motion vector and values of pixels located in the vicinity of the corresponding pixel in the previous picture. According to the invention at least 3×3 pixels from the previous picture are used and the pixel value is calculated as a sum of the previous pixel values weighted by coefficients depending on the motion vector. The coefficients are calculated as functions of the subpixel part of the motion vector, preferrably as polynomials. Further features of the invention are set forth in the accompanying claims.

The invention will now be described in detail referring the enclosed drawings.

DETAILED DESCRIPTION OF PREFERRED EMBODIMENTS

The purpose of the present invention is to assign a value to a pixel which is to be calculated from the previous picture. It is assumed that a vector indicating the position in the old picture corresponding to the actual pixel is available. This situation occurs for instance in picture coding with prediction and standard conversion between different picture formats.

Figure 1:
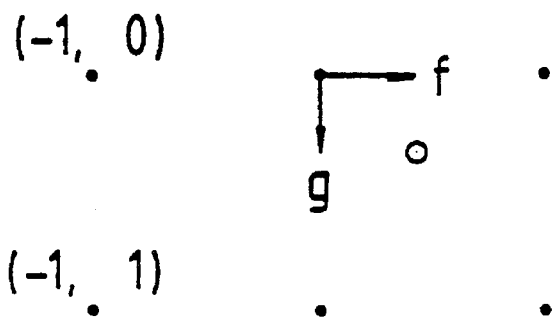
FIG. 1. is a diagram illustrating a 3×3 filter in accordance with the present invention.

In FIG. 1, the positions of nine pixels in the previous picture are shown as dots and the pixel of which the value is to be calculated, is marked with a circle. Thus, in the new picture the circle corresponds to pixel in a fixed barpattern, similar to the nine dots. The motion vector (not shown) may be of arbitrary length. In calculating the new pixel value the integer parts of the motion vector are not used but only the fractional parts from the centre pixel, in the figure denoted by f and g for respective directions. For both f and g $-½ < f ≦ ½$ and $-½ < g ≦ ½$. In accordance with the invention the pixel value q is calculated as $$q(n,k) = \sum_{i=-1}^{1} \sum_{j=-1}^{1} a_i r_j p(n+x+i, k+y+j)$$

where $a_i$ and $r_j$ are the filter coefficients, n, k are the coordinates in the new picture, x+f, y+g is the motion vector, x and y being the integer part and f and g being the fractional part, p is the pixel value in the previous picture.

Thus, referring to FIG. 1, the pixel value of the pixel at the left top should be multiplied with $a_{-1}$ and $r_{-1}$ et cetera.

The problem is separable horisontally and vertically meaning that the coefficient $a_i r_j$ is a product of two coefficients $a_i$ and $r_j$. The following coefficients for a 3×3-filter has been found:

$$a_{-1} = \frac{-2f + 3f^2 - |f^3|}{4}$$

$$a_0 = \frac{2 - 3f^2 + |f^3|}{2}$$

$$a_1 = \frac{2f + 3f^2 - |f^3|}{4}$$

and $r_j$ are identical functions of g.

Figure 2:
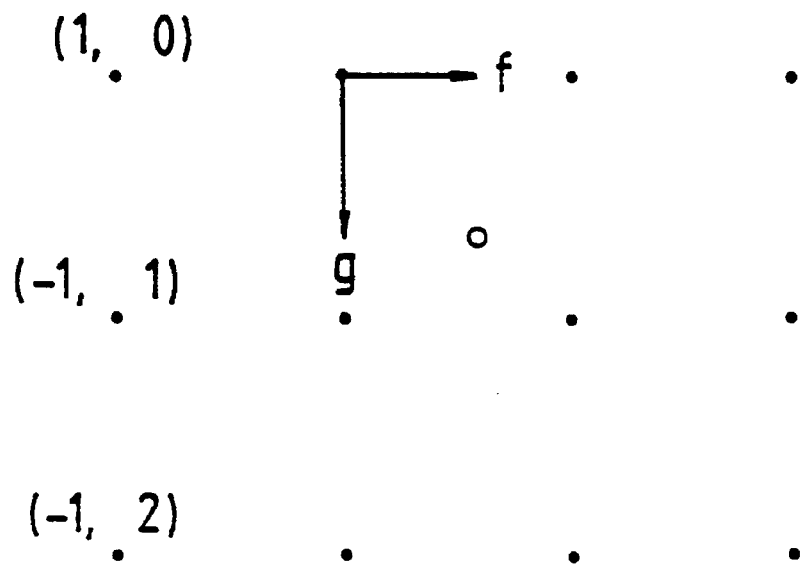
FIG. 2. is a diagram illustrating a 4×4 filter in accordance with the present invention.

In FIG. 2 the corresponding situation of a 4×4 filter is illustrated. For f and g $0 ≦ f < 1$ and $0 ≦ g < 1$. For a 4×4 filter in accordance with the invention the following coefficients are obtained:

$$a_{-1} = \frac{-7f + 12f^2 - 5f^3}{15}$$

$$a_0 = \frac{15 - 3f - 27f^2 + 15f^3}{15}$$

$$a_1 = \frac{12f + 18f^2 - 15f^3}{15}$$

$$a_2 = \frac{-2f - 3f^2 + 5f^3}{15}$$

and $r_j$ are identical functions of g.

The greater filter is chosen, the more information is obtained from the previous picture. In orders greater than four, however, the difference is hardly perceptible to the eye with the present screen technology.

The functions used to calculate the coefficients are chosen in a suitable way. The condition is that $\Sigma a_i = 1$ and $\Sigma r_j = 1$. It should be possible to find other functions as well, preferrably polynomials, using iteration, which would work acceptably.

The coefficients are preferrably stored in a look-up table for fast retrieval for all possible values of f and g.

Thus, the present invention solves the problem with the prior art, because the 3×3 filters and the 4×4 filters do not have the low-pass characteristics of the 2×2 filter. It is also possible with the present invention to move a pixel an arbitrary subpixel distance. The invention is only limited by the claims below.

I claim:

1. A computer-implemented method for generating a series of pictures to be displayed on a screen, each picture having plural picture elements with picture element intensities which represent a part of a picture that has moved a sub-pixel distance, the method using picture element intensities of a preceding picture and a known motion vector to calculate picture element intensities of a current picture, comprising the steps of:

determining two fractional parts, f and g, of a motion vector (x+f, y+g), such that $-\frac{1}{2} < f \leq \frac{1}{2}$ and $-\frac{1}{2} < g \leq \frac{1}{2}$;

determining two integer parts, x and y of the motion vector based on the determined fractional parts, f and g;

generating and storing coefficients $(a_{-1} \ldots a_1)$ using the determined fractional part f, such that:

$$a_{-1} = \frac{-2f + 3f^2 - |f^3|}{4},$$

$$a_0 = \frac{2 - 3f^2 + |f^3|}{2}, \text{ and}$$

$$a_1 = \frac{2f + 3f^2 - |f^3|}{4};$$

generating and storing coefficients $(r_{-1} \ldots r_1)$ using the determined fractional part g, such that:

$$r_{-1} = \frac{-2g + 3g^2 - |g^3|}{4},$$

$$r_0 = \frac{2 - 3g^2 + |g^3|}{2}, \text{ and}$$

$$r_1 = \frac{2g + 3g^2 - |g^3|}{4};$$

calculating a picture element intensity, q(n,k), for a picture element (n, k) in a current picture as a sum of previous pixel values of the preceding picture weighted by the stored coefficients $(a_{-1} \ldots a_1)$ and $(r_{-1} \ldots r_1)$, by computing:

$$q(n,k) = \sum_{i=-1}^{1} \sum_{j=-1}^{1} a_i r_j p(n + x + i, k + y + j)$$

where p(n+x+i,k+y+j) are a picture element intensities of the preceding picture; and displaying the calculated picture element intensity on a screen for each pixel on the screen.

2. A computer-implemented method for generating a series of pictures to be displayed on a screen, each picture having plural picture elements with picture element intensities which represent a part of a picture that has moved a non-integer distance, the method using picture element intensities of a preceding picture and a known motion vector to calculate picture element intensities of a current picture, comprising the steps of:

determining two fractional parts, f and g, of a motion vector (x+f, y+g), such that $0 \leq f < 1$ and $0 \leq g < 1$;

determining two integer parts, X and Y of the motion vector based on the determined fractional parts, f and g;

generating and storing coefficients $(a_{-1} \ldots a_2)$ using the determined fractional part f, such that:

$$a_{-1} = \frac{-7f + 12f^2 - 5f^3}{15},$$

$$a_0 = \frac{15 - 3f - 27f^2 + 15f^3}{15},$$

$$a_1 = \frac{12f + 18f^2 - 15f^3}{15}, \text{ and}$$

$$a_2 = \frac{-2f - 3f^2 + 5f^3}{15};$$

generating and storing coefficients $(r_{-1} \ldots r_2)$ using the determined fractional part g, such that:

$$r_{-1} = \frac{-7g + 12g^2 - 5g^3}{15},$$

$$r_0 = \frac{15 - 3g - 27g^2 + 15g^3}{15},$$

$$r_1 = \frac{12g + 18g^2 - 15g^3}{15}, \text{ and}$$

$$r_2 = \frac{-2g - 3g^2 + 5g^3}{15};$$

calculating a picture element intensity, q(n,k), for a picture element (n, k) in a current picture as a sum of previous pixel values of the preceding picture weighted by the stored coefficients $(a_{-1} \ldots a_2)$ and $(r_{-1} \ldots r_2)$, by computing:

$$q(n,k) = \sum_{i=-1}^{2} \sum_{j=-1}^{2} a_i r_j p(n + x + i, k + y + j)$$

where p(n+x+i,k+y+j) are picture element intensities of the preceding picture; and displaying the calculated picture element intensity on a screen for each pixel on the screen.

3. A computer-implemented method for generating a series of pictures to be displayed on a screen, each picture having plural picture elements with picture element intensities which represent a part of a picture that has moved a non-integer distance, the method using picture element intensities of a preceding picture and a known motion vector to calculate picture element intensities of a current picture, comprising the steps of:

for a picture element (n, k) in a current picture as a sum of previous pixel values of the preceding picture weighted by determining two fractional parts, f and g, of a motion vector (x+f, y+g);

determining two integer parts, x and y of the motion vector based on the determined fractional parts, f and g;

generating and storing coefficients $(a_m \ldots a_n)$ using the determined fractional part f, such that:

$$\sum_{i=m}^{n} a_i = 1$$

generating and storing coefficients $(r_s \ldots r_t)$ using the determined fractional part g, such that:

$$\sum_{j=s}^{t} r_j = 1$$

calculating a picture element intensity, q(n,k), for a picture element (n, k) in a current picture as a sum of previous pixel values of the preceding picture weighted by the stored coefficients $(a_m \ldots a_n)$ and $(r_s \ldots r_t)$, by computing:

$$q(n,k) = \sum_{i=m}^{n} \sum_{j=s}^{t} a_i r_j p(n+x+i, k+y+j)$$

where p(n+x+i,k+y+j) are picture element intensities of the preceding picture; and displaying the calculated picture element intensity on a screen for each pixel on the screen.

* * * * *